United States Patent Office 3,127,364
Patented Mar. 31, 1964

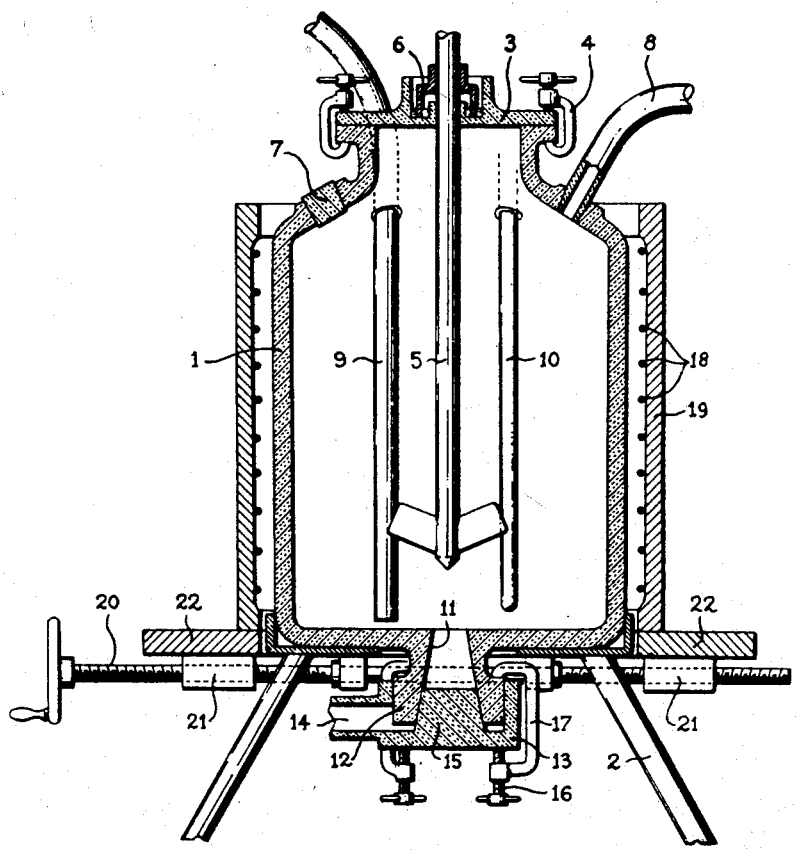

3,127,364
PREPARATION OF ALKYD RESINS IN CONTACT WITH SILICA
Paul Ernest Legendre, Ave. de Fontainebleau, Hericy, France; Camille C. A. Le Bozec Legendre, legal representative of said Paul Ernest Legendre, deceased
Filed Mar. 10, 1958, Ser. No. 720,226
Claims priority, application France Aug. 21, 1957
4 Claims. (Cl. 260—22)

This invention relates to the preparation of synthetic resins, more especially synthetic resins for incorporation in varnish and paint compositions, such as alkyd resins and poly-esters, both modified and unmodified.

It is an object of this invention to provide an improved resin composition and a method of preparing same, whereby the inherent coloring of the resin will be substantially clearer than that heretofore attainable, both in the initial conditions and after incorporation with a varnish or paint composition or the like, and which will retain such clearness with time.

Synthetic resins for incorporations in varnish and paint compositions are required to fulfill a number of desiderata which may be listed as follows:

The resin should be clear, i.e. have low inherent coloring;
It should form a hard film;
The film should resist discoloration or "yellowing";
The film should resist weathering;
The film should be impervious to water and detergent agents;
The film should be flexible and durable.

While most of the above criteria are successfully met by present-day synthetic film-forming resins, the two conditions listed in regard to the initial clearness of the resin and the resistance of the film formed thereby to discoloration, i.e. yellowing, with time, have not heretofore been satisfactorily achieved. It is desirable that a synthetic film-forming resin should possess as low as possible a coloring in the initial condition and that the resulting film should retain such a clear character with time so that the inherent coloring of the resin film will not interfere with the one of a surface on which it is coated as in the case e.g. of a varnish, or with that of a dye incorporated therewith in the case of paint compositions.

In view of the great importance attached in the art to the inherent coloring of synthetic resins, a standard reference scale has been developed, the Gardner scale, and has gained wide acceptance at this time. For a clearer understanding of this invention is is desirable briefly to summarize the Gardner method of color calibration. In this method three separate solutions are used, having the following compositions in weight percent:

(1) Ferric chloride solution— Percent
   $FeCl_3 \cdot 6H_2O$ _____ 5
   2% HCl solution_____ 0.5
(2) Cobalt chloride solution—
   $CoCl_2 \cdot 6H_2O$ _____ 1
   2% HCl solution _____ 3
(3) 2% Hydrochloric acid solution.

The 1 value of the Gardner scale is assigned to a mixture of the three solutions in the following proportions: solution 1, 0.13%; solution 2, 0.19%; solution 3, 99.68%. This mixture has a very light clear color.

A scale calibration of 18 is arbitrarily assigned to pure solution 1. The intervening scale calibrations from 1 to 18 are attributed to intermediate mixtures of the three solutions in various proportions such as to obtain substantially uniformly increasing depths of coloring.

In order to determine the color index of a given resin in the Gardner scale the resin is diluted in a suitable solvent to a concentration of 50% and this solution is matched as to depth of tone with the standard solutions of the scale. The tested resin is then assigned the same index as that of the standard solution which is found to match most closely the dilute resin solution under test.

Conventional resins used for varnish and paint compositions have Gardner color indexes in a range of from 3 to 10 and all attempts to lower the color index thereof have heretofore failed. It is, therefore, an object of this invention to provide synthetic resins which will have Gardner index values substantially less than 3, and more specifically Gardner index values lower than 1.5.

In investigating the factors affecting the inherent coloring of a resin, prior workers have investigated the influence of purity of the starting materials, character of the surrounding atmosphere, rate of heating and nature of the constituent material of the reactor apparatus. It has been previously shown that the reaction should preferably be performed in an inert atmosphere, such as carbonic acid gas. High purity starting stock has been used. And reactors have been tested made of such widely varying materials as iron, copper, aluminium, enamel coated steel, Monel metal, nickel plated copper, silver plated copper and stainless steel. Heat is now usually supplied by fluid circulation rather than direct heating. In spite of all the above precautions including the use of expensive stainless steel reactors, it has not been found possible to produce synthetic resins having initial coloring less than that corresponding to the value 3 in the Gardner scale, as indicated above.

I have now discovered that it is entirely practical to produce synthetic resins having fully satisfactory film forming properties, and having a color index, as measured with a 50% solution in the Gardner scale, of the order of about 1 and less, e.g. in a range of from 0.25 to 1.5 depending on the type of oil used. In achieving this result my invention essentially consists in reacting the resin constituents, and handling the resin prior to cooling thereof, in the exclusive presence of pure silica.

I have found that, with all remaining reaction conditions remaining the same, the inherent coloring of the resin is markedly reduced if all contact of the reagents and the resin prior to cooling, with materials other than pure silica is carefully avoided. The above requirement involves the necessity of using reactor apparatus and ancillary equipment such as agitators, inlet and outlet pipes, thermometer probes, and so on, entirely made from silica or quartz. Conveniently the apparatus is heated by means of electrical resistors which may be arranged around the outer surfaces thereof.

My invention includes within its scope such apparatus and equipment. It is noted at this point that such apparatus made of pure silica is found to be substantially less expensive than the stainless steel apparatus used heretofore with considerably inferior results.

While it should be understood that various types of resins may advantageously be prepared by the method of my invention, especially advantageous results have been obtained with alkyd resins and polyester resins, modified and unmodified. It is recalled that alkyd resins are produced by true condensation of polyacids and polyalcohols, a typical example being the glycerophthalic resins which result from a combination of glycerine with phthalic anhydride. Alkyd resins may be modified by means of oils, urea-formol resins, phenol resins, rosin, and natural resins, poly-isocyanates, polyurethanes, phthalides, naphthalene, arysulfamide resins, rubber, vinyl resins, amid resins and imine resins.

Polyester resins are produced by limited condensation of poly-acids and polyalcohols followed by polymerization, one at least of said reagents being unsaturated, such as maleic acid. The polyester resins may or may not be modified with oils.

Any of the resins listed above constitute superior constituents for varnish and paint compositions and their preparation according to the method of the invention results in a very substantial improvement in the quality of the varnish and paint compositions in which they may be incorporated.

As a means of illustrating the present invention apparatus will now be described whereby the improved process can be conveniently performed. Examples of practical procedure will be given thereafter.

The single figure of the accompanying drawing is a schematic axial cross section of improved reactor apparatus. As shown an upstanding container 1 is made entirely from fused silica or quartz glass and is supported on a tripod stand 2. The reactor has a central top opening fitted with a cover 3 made of fused silica and held in place with retainer clamps 4. Extending through a central aperture in the cover is an agitator rod 5 made of silica, the aperture being sealed with a mercury seal 6. A tapered side opening is provided for loading purposes and is sealed by a removable silica plug 7 the complementary taper surfaces being carefully mated by mutual friction. By generally similar means a quartz glass conduit 8 is connected to the reactor body for discharging volatile reaction products, as well as a plunger tube 9 and a thermometer probe 10, all made of fused silica or quartz glass.

A flared discharge outlet 11 is formed through a depending bottom boss 12 which is a sliding fit in the open top of a receptacle 13 formed with a side outlet conduit 14. A taper plug 15 upstanding from the bottom of the receptacle is adjustably insertable into outlet 11 by means of screws 16 coacting with clamps 17 securing receptacle 13 to boss 12. Thus outlet 11 may be sealed off from or connected to conduit 14 as required. It will be understood that all parts last described including receptacle 13, plug 15 and line 14 are likewise made of fused silica or quartz glass, so that silica is the sole substance with which the reagents are allowed to contact.

External heating means are provided for the apparatus in the form of electrical resistors 18 imbedded in a pair of semi-cylindrical shells 19 surrounding the reactor 1. The shells can be adjusted in position towards and away from the reactor by means of a worm 20 having oppositely threaded portions cooperating with nuts 21 secured at the base of a pair of slider carriage 22 supporting the respective shell members 19.

Examples will now be given of the procedure used in preparing improved resin compositions when employing a reactor of the kind just described.

*Example 1.—Preparation of Linseed Oil-Modified Glycerophthalic Resin*

A mixture comprising:

| | Parts |
|---|---|
| Linseed oil | 350 |
| Phthalic anhydride | 500 |
| Glycerine | 250 |
| Total | 1100 | was heated in the reactor described at about 200° C. to 220° C. for 25 hours in a carbonic acid gas atmosphere. The resulting resin had a Gardner color scale reading of 1. A resin composition prepared in identically the same manner in a conventional apparatus had a Gardner scale reading of 8. The remaining characteristics of the two compositions, including viscosity, acid index, etc., are the same.

Similar results were obtained when glycerophthalic resin is modified with various proportions of oil other than linseed oil. The ensuing table indicates the improvement in coloring observed between such various compositions as obtained in a conventional reactor and a reactor according to the invention.

| Resin composition tested in 50% solution | Gardner color scale index | |
|---|---|---|
| | Conventional reactor | Improved reactor |
| Resin modified with 40% soya oil | 5 to 7 | 1 |
| Resin modified with 65% soya oil | 7 to 9 | 1 |
| Resin modified with 35% coprah oil | 3 to 6 | 0.5 |

*Example 2.—Unmodified Glycerophthalic Resin*

A mixture comprising:

| | Parts |
|---|---|
| Phthalic anhydride | 1000 |
| Glycerine | 475 |
| Total | 1475 | was heated at 200° C. for about 10 hours in an atmosphere of $CO_2$ in a reactor of the type described above. The resulting resin had a Gardner color index of 1. An identically prepared resin using a conventional reactor had a Gardner index 6.

*Example 3.—Polyester Resin Modified With Linseed Oil*

A mixture comprising:

| | Parts |
|---|---|
| Linseed oil | 500 |
| Maleic anhydride | 120 |
| Phthalic anhydride | 280 |
| Glycerine | 220 |
| Total | 1120 | was placed in an improved reactor and maintained at 200° C. for 10 hours in $CO_2$ atmosphere. The resulting resin had a Gardner color index 1. A similarly prepared resin made in conventional apparatus had a Gardner index 6.

*Example 4.—Unmodified Polyester Resin*

A mixture comprising:

| | Parts |
|---|---|
| Ethylene glycol | 670 |
| Maleic anhydride | 600 |
| Phthalic anhydride | 300 |
| Total | 1570 | was maintained at 200° C. for 10 hours in a $CO_2$ atmosphere in an improved silica reactor. The resulting resin had a Gardner index 1. A resin prepared similarly but using conventional reactor apparatus had a Gardner color index 5.

The improved coloring in resins according to the invention brings about important advantages in varnish and paint compositions in which it is incorporated. Thus, in one paint having the following composition:

| | Parts |
|---|---|
| Titanium oxide | 300 |
| Oil-modified glycerophthalic resin, 50% solution in xylene | 700 | is a pure white when embodying a resin prepared in accordance with Example 1. On the other hand, a similar paint produced with a resin prepared according to prior processes is yellowish. Moreover, it has been found that resins prepared according to the method of the invention show improved resistance to discoloration or yellowing with time, as compared to similar resins prepared by conventional methods.

It will be understood that various modifications may be made in the details of apparatus described and shown, as well as in the nature and proportions of the ingredients specified, without exceeding the scope of the invention. In particular, while the reactor body I have shown as comprising solid walls of fused silica, the invention may be embodied in reactor apparatus having walls that are internally lined with silica.

What I claim is:

1. A method of preparing alkyd resins wherein constituents comprising a polyhydric alcohol, a polycarboxylic acid and a fatty oil are heated at about 200 to 220 degrees C. for a period of time sufficient to form the resin in exclusive contact with substantially pure silica.

2. A method of preparing alkyd resins according to claim 1 wherein the constituents include phthalic anhydride and glycerine.

3. A method of preparing alkyd resins according to claim 1 wherein the polycarboxylic acid is unsaturated.

4. In a method of preparing alkyd resins wherein constituents comprising a polyhydric alcohol, a polycarboxylic acid and a fatty oil are heated at about 200 to 220 degrees C. for a period of time sufficient to form the resin, the improvement which consists of preventing substantially any contact of said constituents during said period and of said resin prior to substantial cooling with substances other than substantially pure silica.

References Cited in the file of this patent

UNITED STATES PATENTS

| | | |
|---|---|---|
| 1,998,744 | Ubben | Apr. 23, 1935 |
| 2,378,138 | Gaylor | June 12, 1945 |
| 2,411,599 | Sparks | Nov. 26, 1946 |
| 2,465,319 | Whinfield | Mar. 22, 1949 |
| 2,504,488 | Antonio et al. | Apr. 18, 1950 |
| 2,720,505 | Caldwell | Oct. 11, 1955 |
| 2,758,105 | Alles et al. | Aug. 7, 1956 |
| 2,822,348 | Haslam | Feb. 4, 1958 |